(12) United States Patent
Park et al.

(10) Patent No.: US 11,929,209 B2
(45) Date of Patent: Mar. 12, 2024

(54) METAL CASE CAPACITOR

(71) Applicant: NUINTEK CO LTD, Chungcheongnam-do (KR)

(72) Inventors: Dae-Jin Park, Chungcheongnam-do (KR); Ying-Won Jeon, Chungcheongnam-do (KR); Jin-A Park, Chungcheongnam-do (KR)

(73) Assignee: NUINTEK CO LTD, Chungcheongnam-do (KR)

( * ) Notice: Subject to any disclaimer, the term of this patent is extended or adjusted under 35 U.S.C. 154(b) by 107 days.

(21) Appl. No.: 17/788,622

(22) PCT Filed: Jun. 29, 2021

(86) PCT No.: PCT/KR2021/008158
§ 371 (c)(1),
(2) Date: Jun. 23, 2022

(87) PCT Pub. No.: WO2022/097871
PCT Pub. Date: May 12, 2022

(65) Prior Publication Data
US 2023/0039264 A1 Feb. 9, 2023

(30) Foreign Application Priority Data
Nov. 6, 2020 (KR) .......................... 10-2020-0147411

(51) Int. Cl.
*H01G 4/224* (2006.01)
*H01G 4/228* (2006.01)
(Continued)

(52) U.S. Cl.
CPC ............. *H01G 4/224* (2013.01); *H01G 4/228* (2013.01); *H01G 4/38* (2013.01); *H01G 4/32* (2013.01)

(58) Field of Classification Search
None
See application file for complete search history.

(56) References Cited

FOREIGN PATENT DOCUMENTS

JP 2009252934 A * 10/2009
KR 10-2011-0101454 A 9/2011
(Continued)

OTHER PUBLICATIONS

International Search Report from corresponding PCT Application No. PCT/KR2021/008158, dated Oct. 20, 2021.

*Primary Examiner* — Eric W Thomas
(74) *Attorney, Agent, or Firm* — Harness, Dickey & Pierce, P.L.C.

(57) ABSTRACT

The present disclosure relates to a metal case capacitor that includes: a capacitor module (10) including a capacitor device, a first busbar (1) electrically connected with a thermally-sprayed surface of the capacitor device and having a first lead terminal (1*a*) on an exposed side, a second busbar (2) electrically connected with the other thermally-sprayed surface of the capacitor device and having a second lead terminal (2*a*) on an exposed side, and an insulating sheet disposed between the first busbar (1) and the second busbar (2); a metallic external case (20) having a space; a plastic insulating member positioned between the capacitor module (10) and the metallic external case (20) and insulating the capacitor module (10) and the metallic external case (20) from each other; and a filler permeating in a gel or liquid state into a space between the capacitor module (10) and the metallic external case (20).

10 Claims, 8 Drawing Sheets

(51) Int. Cl.
 *H01G 4/38* (2006.01)
 *H01G 4/32* (2006.01)

(56) References Cited

FOREIGN PATENT DOCUMENTS

| | | |
|---|---|---|
| KR | 101363285 B1 * | 2/2014 |
| KR | 10-1436787 B1 | 9/2014 |
| KR | 10-2016-0062447 A | 6/2016 |
| KR | 10-2017-0034956 A | 3/2017 |
| KR | 10-2019-0069963 A | 6/2019 |

\* cited by examiner

Single insulation gap formation member (straight member)

Disposition state of insulation gap formation member (straight member)

METAL CASE CAPACITOR

CROSS-REFERENCE TO RELATED APPLICATIONS

This application is a national phase application of PCT Application No. PCT/KR2021/008158, filed on 29 Jun. 2021, which claims priority to Korean Patent Application No. 10-2020-0147411, filed on 6 Nov. 2020. The entire disclosures of the applications identified in this paragraph are incorporated herein by references.

FIELD OF THE INVENTION

The present disclosure relates to a metal case capacitor that includes a net-shaped plastic spacer for insulation therein, has a metal case as the outer part, and has high heat dissipation performance, and a method of manufacturing the metal case capacitor

DESCRIPTION OF THE RELATED ART

In general, film capacitors are generally used in various industrial fields, and for example, a capacitor for electric devices, a low-voltage power capacitor, a capacitor for an inverter, a capacitor for a filter, etc. are well known.

In order to manufacture these capacitors, a dielectric film (or also called a plastic film) such as polyester (PET) resin, polypropylene (PP) resin, polyethylene naphthalene (PEN) resin, polycarbonate (PC) resin, polyphenylene sulfide (PPS) resin is used as a dielectric, and a deposited film formed by depositing zinc, aluminum, or an aluminum alloy or primarily depositing aluminum and then secondarily using zinc, etc. on one side or both sides of a dielectric film is used as an electrode.

A film capacitor is manufactured by winding two sheets of deposited films making a pair. In order to use both sides of a wound capacitor device for leading electrodes, thermally-sprayed surfaces are formed by thermally spraying zinc or a zinc alloy to both sides of the capacitor device, busbars, electrode leads, or electrode terminals are coupled to the thermally-sprayed surfaces through spotting, solder, etc., the capacitor device is inserted into an external case, and then an insulator such as epoxy or urethane is put into the external case and then cured, whereby the capacitor device can be manufactured as a case mole type capacitor.

A power source is connected to the busbars, the leads, or the electrode terminals of the capacitor device, and in this case, a current flows in the width direction of the deposited films from the thermally-sprayed surface formed on both sides of the capacitor device. A current flowing to the capacitor device is proportioned to the area of deposited metal. A large amount of current flows to the deposited film close to the thermally-sprayed surface in the width direction of the deposited film, but a relatively small amount of current flows to the deposited film far from the thermally-sprayed surfaces.

When a capacitor case is made of plastic in the related art, there is no problem with an insulation withstanding voltage between the case and P/N electrodes (P and N electrodes of a module configuration unit formed by connecting P and N electrode busbars to a metallicon surface of an internal element in the capacitor).

When a metal case is used, there is a problem of poor insulation withstanding voltage between the metal (aluminum, steel, or non-steel metal) case of a capacitor and the capacitor P/N electrodes (P and N electrodes of a module configuration unit formed by connecting P and N electrode busbars to a metallicon surface of an internal element in the capacitor).

Reason of poor insulation: A unit having P and N electrode busbars connected to a metallicon surface of an internal element of a capacitor is put into a metal case, molding is performed using a molding material such as epoxy or urethane, an insulation distance between P/N electrodes composed of the metal case and the capacitor element is biased to a side, so the insulation distance decreases, or the insulation ability between the P/N electrodes composed to the metal case and the capacitor module decreases due to conductive foreign substances, whereby poor insulation is generated.

SUMMARY OF THE INVENTION

The present disclosure provides a metal case capacitor having a net-shaped plastic insulation housing in a metal housing, the metal case capacitor having a net-shaped plastic insulation housing in a metal housing, the metal case capacitor having the excellent heat dissipation characteristic of a metal case and being able to solve the problem of a short circuit between a metal case and P/N electrodes of a capacitor.

The present disclosure provides a metal case capacitor in which a plastic insulation housing is formed in a net shape to have a plurality of openings, whereby a metal housing, a plastic housing, and a capacitor module (unit) are strongly coupled by the filler; and the gap between the inner surfaces of the metal housing and the capacitor module (unit) is accurately maintained by the thickness of insulation gap formation members of the plastic insulation housing.

Further, the present disclosure provides a metal case capacitor in which straight members constituting insulation gap formation members of a plastic insulation housing are formed in a shape in which a thick section and thin section are repeated and stepped spaces are formed or in a pulse wave shape, whereby excellent durability is maintained even against strong shock because epoxy is completely filled without an air void, and a defect is not generated because an insulation withstanding voltage between a metal case and P/N electrodes of a capacitor is improved.

A metal case capacitor according to an embodiment of the present disclosure includes: a capacitor module (10) including a capacitor device (C) formed by winding a dielectric film and having thermally-sprayed surfaces on both sides, a first busbar (1) electrically connected with a thermally-sprayed surface of the capacitor device and having a first lead terminal (1a) on an exposed side, a second busbar (2) electrically connected with the other thermally-sprayed surface of the capacitor device (C) and having a second lead terminal (2a) on an exposed side, and an insulating sheet disposed between the first busbar (1) and the second busbar (2) to insulate an overlap region; a metallic external case (20) having a space, in which the capacitor module (10) is accommodated, and made of a metal material; a plastic insulating member positioned between the capacitor module (10) and the metallic external case (20) and insulating the capacitor module (10) and the metallic external case (20) from each other; and a filler permeating in a gel or liquid state into a space between the capacitor module 10 and the metallic external case 20 and then cured.

In the metal case capacitor according to an embodiment of the present disclosure, it is preferable that the plastic insulation member is a plastic insulation housing (30), has a plurality of separate openings, and forms a 3D space, and insulation gap formation members positioned on a plurality of planes forming the outline of the space have openings for permeation of the filler, the area ratio of the opening should be at least 50% of the entire area, and the thickness of the plastic insulation member (30) is 1~10 mm.

In the metal case capacitor according to an embodiment of the present disclosure, it is preferable that the plastic insulation housing (30) is a plastic housing having plurality of separate openings and forms a 3D space and insulation gap formation members positioned on a plurality of planes forming the outline of the space are disposed in a mesh type.

According to the present disclosure, there is provided a metal case capacitor having a net-shaped plastic insulation housing in a metal housing, the metal case capacitor having the excellent heat dissipation characteristic of a metal case and being able to solve the problem of a short circuit between a metal case and P/N electrodes of a capacitor.

Further, according to the present disclosure, there is provided a metal case capacitor in which a plastic insulation housing is formed in a net shape to have a plurality of openings, whereby the direct coupling area between metal and a filler is increased and adhesion is improved because the filler is supplied through the openings; a metal housing, a plastic housing, and a capacitor module (unit) are strongly coupled by the filler; and the gap between the inner surfaces of the metal housing and the capacitor module (unit) is accurately maintained by the thickness of insulation gap formation members of the plastic insulation housing.

Further, according to the present disclosure, there is provided a metal case capacitor in which straight members constituting insulation gap formation members of a plastic insulation housing are formed in a shape in which a thick section and thin section are repeated and stepped spaces are formed or in a pulse wave shape, whereby excellent durability is maintained even against strong shock because epoxy is completely filled without an air void, and a defect is not generated because an insulation withstanding voltage between a metal case and P/N electrodes of a capacitor is improved.

DETAILED DESCRIPTION OF THE INVENTION

A metal case capacitor according to an embodiment of the present disclosure includes: a capacitor module 10 including a capacitor device C formed by winding a dielectric film and having thermally-sprayed surfaces on both sides, a first busbar 1 electrically connected with a thermally-sprayed surface of the capacitor device and having a first lead terminal 1a on an exposed side, a second busbar 2 electrically connected with the other thermally-sprayed surface of the capacitor device C and having a second lead terminal 2a on an exposed side, and an insulation sheet disposed between the first busbar 1 and the second busbar 2 to insulate an overlap region; a metallic external case 20 having a space, in which the capacitor module 10 is accommodated, and made of a metal material; a plastic insulation member positioned between the capacitor module 10 and the metallic external case 20 and insulating the capacitor module 10 and the metallic external case 20 from each other; and a filler permeating in a gel or liquid state into a space between the capacitor module 10 and the metallic external case 20 and then cured therein.

In the metal case capacitor according to an embodiment of the present disclosure, it is preferable that the plastic insulation member is a plastic insulation housing 30, has a plurality of separate openings, and forms a 3D space, insulation gap formation members positioned on a plurality of planes forming the outline of the space have openings for permeation of the filler, the area ratio of the opening should be at least 50% of the entire area, and the thickness of the plastic insulation member 30 is 1~10 mm.

In the metal case capacitor according to an embodiment of the present disclosure, it is preferable that the plastic insulation housing 30 is a plastic housing having a plurality of separate openings and forms a 3D space and insulation gap formation members positioned on a plurality of planes forming the outline of the space are disposed in a mesh type.

Figure 1:
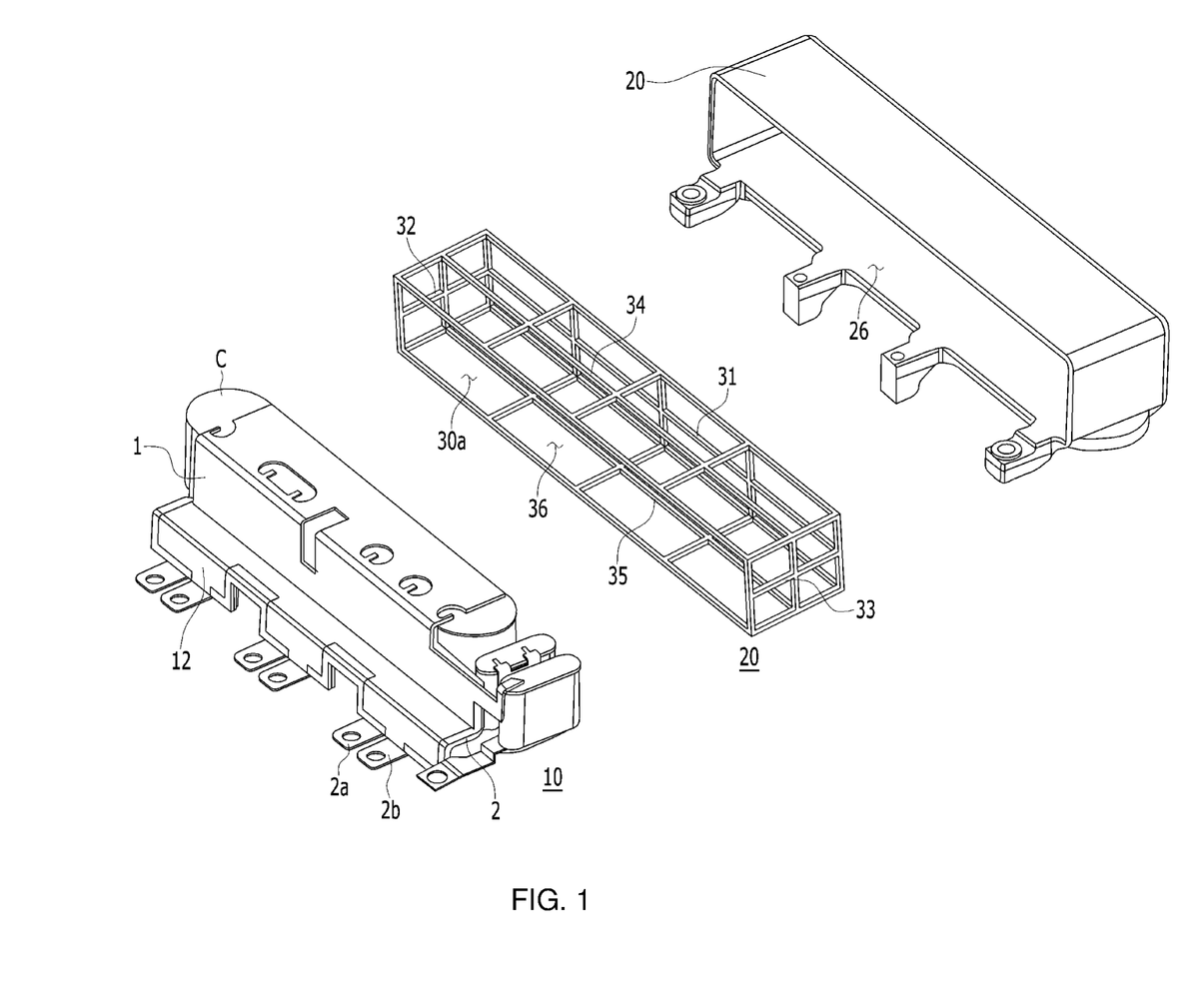
FIGS. 1 and 3 are configuration views showing the entire of a metal case capacitor according to an embodiment of the present disclosure.
Figure 2:
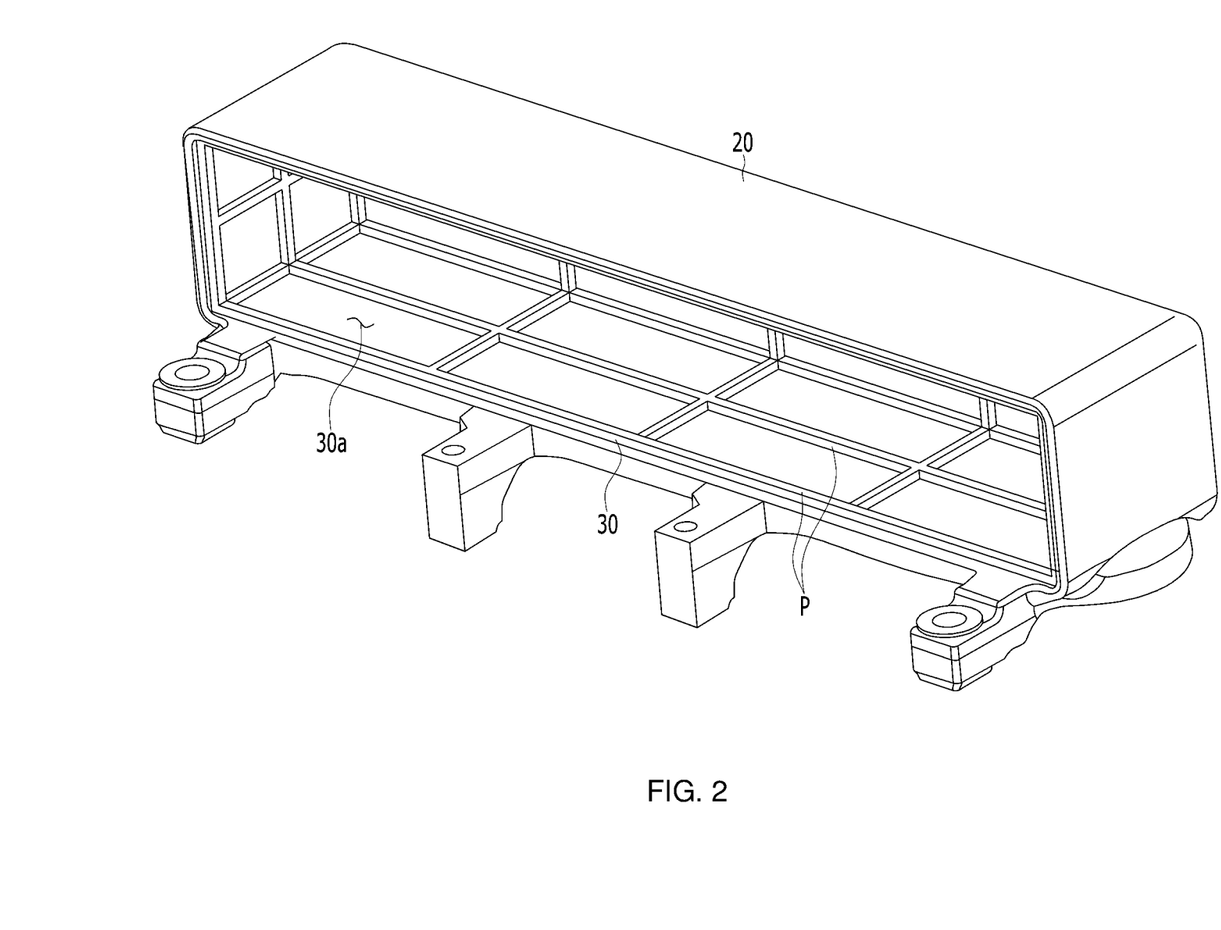
FIGS. 2 and 4 are configuration views showing a metal case and a plastic insulation housing of the metal case capacitor according to an embodiment of the present disclosure.
Figure 3:
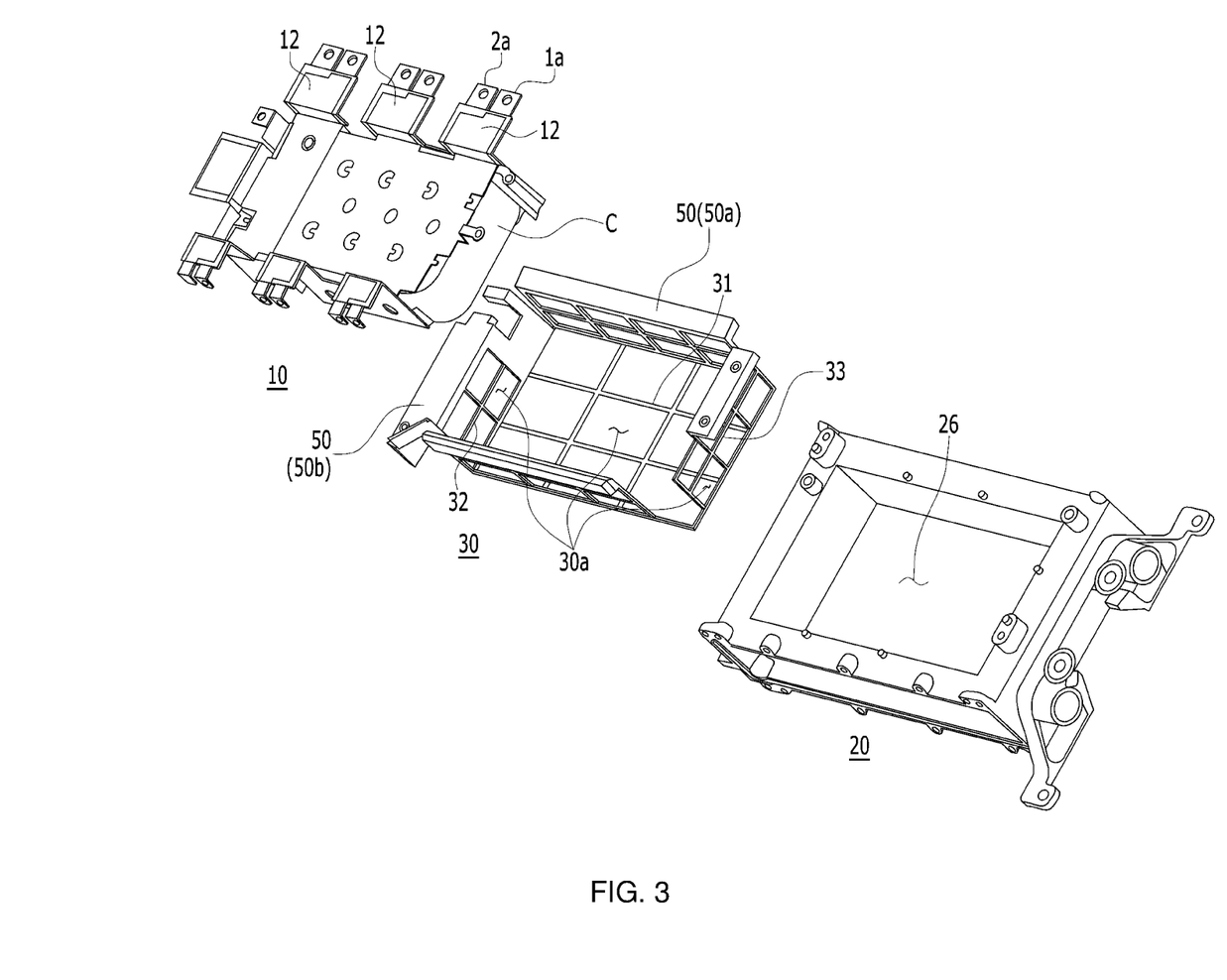
Figure 4:
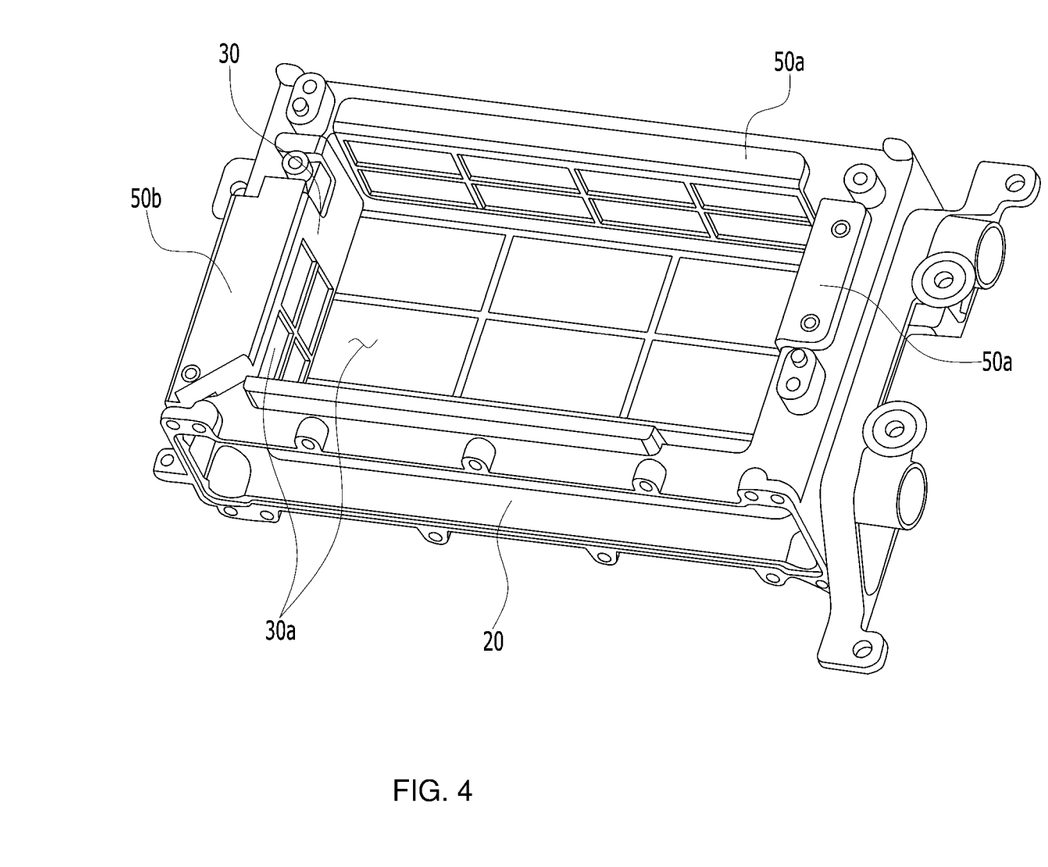

Hereafter, a metal case capacitor according to an embodiment of the present disclosure is described in detail with reference to the accompanying drawings. FIGS. 1 and 3 are configuration views showing the entire of a metal case capacitor according to an embodiment of the present disclosure, FIGS. 2 and 4 are configuration views showing a metal case and a plastic insulation housing of the metal case capacitor according to an embodiment of the present disclosure, and FIG. 5 is a view showing a straight member of the plastic insulation housing according to an embodiment of the present disclosure.

As shown in FIGS. 1 to 5, a metal case capacitor of the present disclosure includes a capacitor module 10, a metallic external case 20, a plastic insulation member, and a filler 40.

As shown in FIGS. 1 and 3, the capacitor module 10 includes: a capacitor device C formed by winding a dielectric film and having thermally-sprayed surfaces on both sides, a first busbar 1 electrically connected with a thermally-sprayed surface of the capacitor device and having a first lead terminal 1a on an exposed side, a second busbar 2 electrically connected with the other thermally-sprayed surface of the capacitor device C and having a second lead terminal 2a on an exposed side, and an insulating sheet disposed between the first busbar 1 and the second busbar 2 to insulate an overlap region;

As shown in FIGS. 1 and 3, the metallic external case 20 has a space, in which the capacitor module 10 is accommodated, and is made of a metal material. The plastic insulation member is positioned between the capacitor module 10 and the metallic external case 20 and insulates the capacitor module 10 and the metallic external case 20 from each other. The filler permeates in a gel or liquid state into a space between the capacitor module 10 and the metallic external case 20 and is then cured therein. The filler is epoxy or urethane.

As shown in FIGS. 1 to 4, it is preferable that the plastic insulation member is a plastic insulation housing 30, has a plurality of separate openings, and forms a 3D space, insulation gap formation members positioned on a plurality of planes forming the outline of the space have openings for permeation of the filler, the area ratio of the opening should be at least 50% of the entire area, and the thickness of the plastic insulation member 30 is 1~10 mm.

As shown in FIGS. 2 and 4, in an embodiment, the outer outline of the plastic insulation housing 30 is formed to correspond to the inner outline of the metallic external case 20 and the plastic insulation housing 30 may be formed have a minimum gap to be tightly fitted on and inserted inside the inner surface of the metallic external case 20.

In an embodiment, the inner outline of the plastic insulation housing 30 is formed about 1~2 mm larger than the outer outline of the capacitor module 10, so a filler having excellent fluidity is filled in the gap of 1~2 mm between the inner outline of the plastic insulation housing 30 and the outer outline of the capacitor module 10.

As shown in the figures, in an embodiment, the inner outline of the inner sides (four sides except for open surfaces and the floor, insulation gap formation members 32, 33, 34, and 35) of the plastic insulation housing 30 is about 1~2 mm larger than the outer outline of the capacitor module 10, a filler that has excellent fluidity and is put into the open part (top open part) flows into and fills the gap of about 1~2 mm between the side outline of the plastic insulation housing 30 adjacent to the open part (top open part) and the outer outline of the capacitor module 10.

It is preferable that the plastic insulation housing 30 is a plastic housing having a plurality of separate openings and forms a 3D space and insulation gap formation members positioned on a plurality of planes forming the outline of the space are disposed in a mesh type.

As shown in FIGS. 1 to 4, the plastic insulation housing 30, for example, the metallic external case 20 has a substantially hexahedral space and is closed on five surfaces except for a first open part 26 providing an input space for supplying a filler. The plastic insulation housing 30 has an outline corresponding to the inner surfaces of the metallic external case 20 and has insulation formation members 31, 32, 33, 34, and 35 on five surfaces except for a second open part 36 positioned to correspond to the first open part. Insulation gap formation members positioned on a plurality of planes forming the outline of a space are provided in a mesh type.

A filler permeates into the plastic insulation housing 30 through a plurality of separate openings 30a or a plurality of separate openings 30a existing in the mesh type and is cured therein, so the plastic insulation housing 30 can be strongly fixed to the inner surfaces of the metallic external case 20. In this case, the insulation gap formation members 31, 32, 33, 34, and 35 serve to uniformly maintain the gap between the capacitor module 10 and the inner surfaces of the metallic external case 20. As the plastic material, PS, PET, PP, PPS, PBT, PC, and ABS are available.

<Shape of Insulation Gap Formation Member with Repeated Thick Section and Thin Section>

Figure 5A:
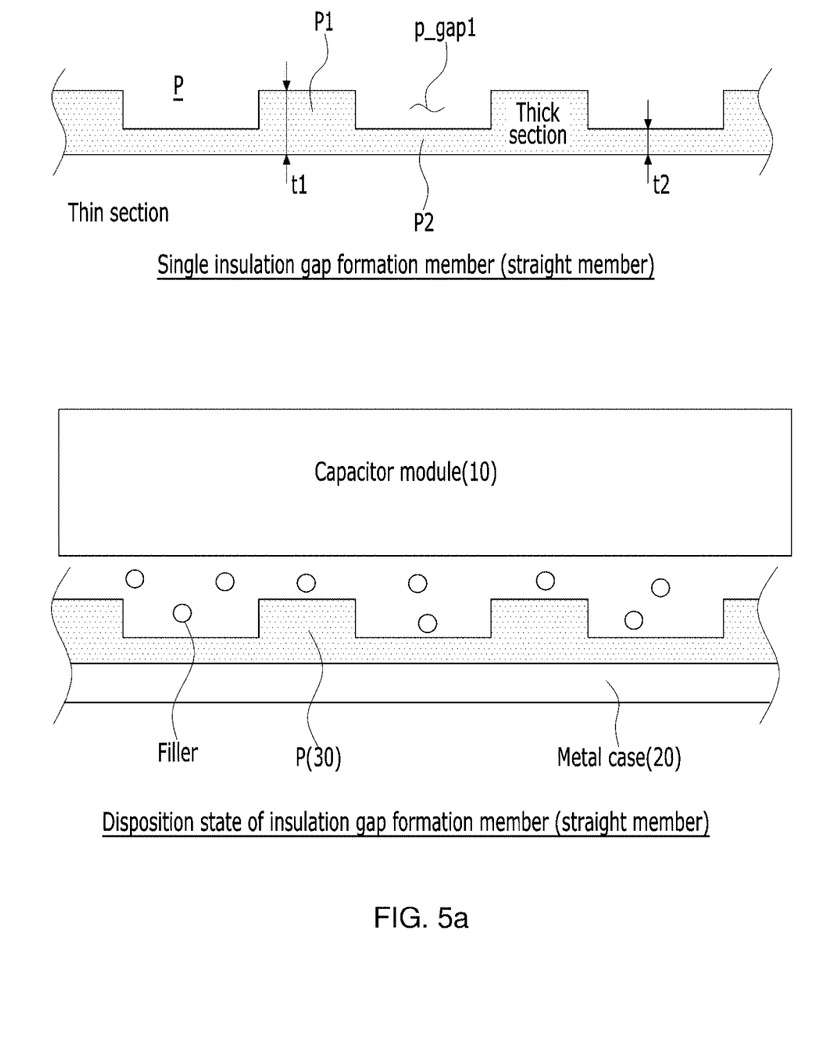
FIGS. 5a and 5b are views showing a straight member of the plastic insulation housing according to an embodiment of the present disclosure.

As shown in FIGS. 2, 4, and 5a, the insulation gap formation members 31, 32, 33, 34, and 35 form a 3D net with an open surface by forming a net by crossing plastic straight members, and plastic straight members P may be provided in a shape in which a thick section P1 and a thin section P2 having a thickness t2 smaller than the thickness t1 of the thick section are repeated.

When the plastic insulation housing 30 and the capacitor module 10 are seated in the metallic external case 20, the filer permeation space narrowed by the insulation gap formation members adjacent to the first and second open parts is widened by a stepped space P_gap1 formed by the thick section p2, so permeation of a filler becomes easy.

It could be seen from a test result that predetermined strength and gap (between metal and the capacitor module) could be maintained and permeability of a filler was excellent when the thickness t1 of the thick section P1 of the plastic straight member P is 2~2.5 mm and the thickness t2 of the thin section P2 is 0.7~4 mm. For example, a plastic straight member P constituting the insulation gap formation members 31, 32, 33, 34, and 35 may be manufactured such that the thickness of a thick section is 2.5 mm and the thickness of the thin section is 1.0 mm.

<Insulation Gap Formation Member with Pulse Wave Shape>

Figure 5B:
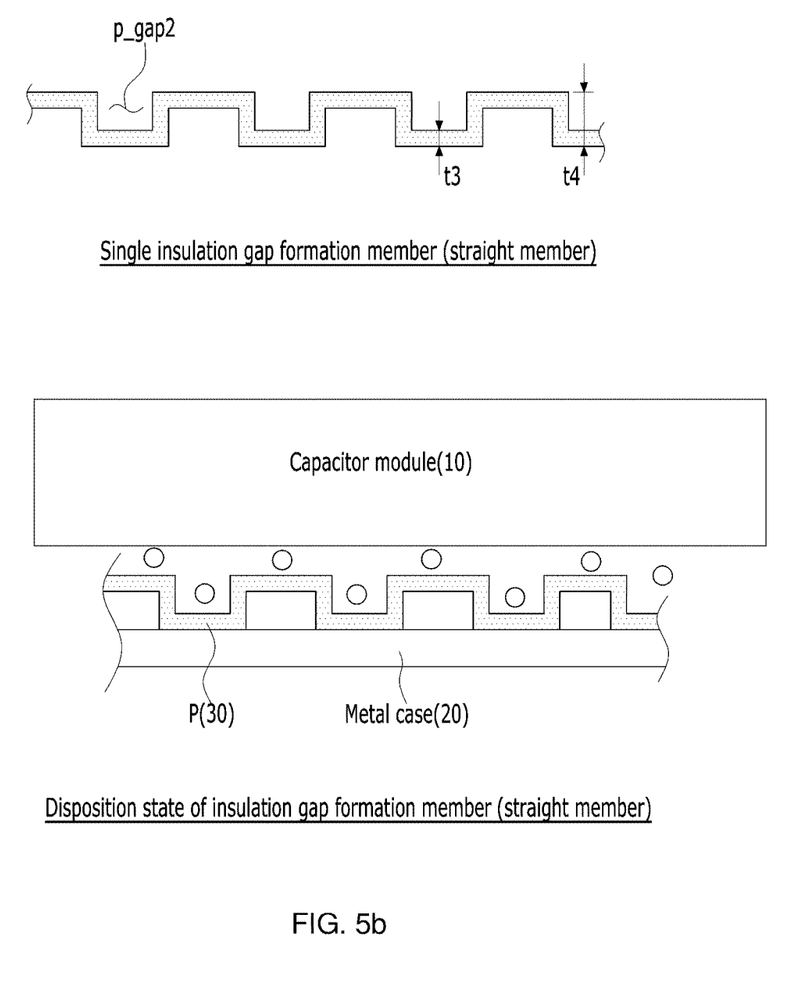

As shown in FIGS. 2, 4, and 5b, the insulation gap formation members 31, 32, 33, 34, and 35 of the plastic insulation housing 30 form a 3D net with an open surface by forming a net by crossing plastic straight members P, and the plastic straight members P may be pulse wave-shaped straight members having a third thickness t3 and having an entirely straight profile (outline) in which bending and unbending are repeated.

When the plastic insulation housing 30 and the capacitor module 10 are seated in the metallic external case 20, the filer permeation space narrowed by the insulation gap formation members adjacent to the first and second open parts is widened by repeatedly spaces P_gap2 formed on the straight profile (outline), so permeation of a filler becomes easy.

It could be seen that when the insulation gap formation members of the net-shaped plastic insulation housing are formed in pulse wave shapes, epoxy was fully filled with the epoxy was filled and an air void was not formed, so the insulation withstanding voltage between the metal case and the P/N electrodes of the capacitor was improved and a defect was not generated.

<Insulation Member at Exposed Side>

As shown in FIGS. 1 to 5, the metal case capacitor of the present disclosure further includes: a plurality of busbar extensions integrally formed at the busbar 1 and having a first lead terminal 1a at the front ends in an exposed state outside the case or the filler; and second busbar extensions integrally formed at the second busbar 2, having a second lead terminal 2a at the front ends in an exposed state outside the case or the filler, and overlapping the first busbar extensions.

An exposed-side insulation member 50 is configured such that at least two or more first busbar extensions and second busbar extensions overlap each other while each making a pair, thereby forming at least two or more extension assemblies 12 and insulating the non-exposed sides of the extension assembly 12 of the capacitor module 10 and the top of the opening of the metallic external case 20 from each other. Preferably, the exposed-side insulation member 50 is integrally formed with the plastic insulation housing 30 by injection molding.

As show in the figures, in an embodiment, at least two or more exposed-side insulation members 50 are formed. The exposed-side insulation member 50 may be an "¬-shaped member" composed of a vertical bar connected with the embedded plastic insulation housing 30 and extending upward toward the open part and a horizontal portion perpendicularly bending from the front end of the vertical portion and being in contact with the top of the opening of the metallic external case 20. Further, in an embodiment, the exposed-side insulation member 50 may be a "⊏-shaped member" composed of a vertical bar connected with the embedded plastic insulation housing 30 and extending upward toward the open part, a horizontal portion perpendicularly bending from the front end of the vertical portion and being in contact with the top of the opening of the metallic external case 20, and a second vertical portion bending downward from the front end of the horizontal portion.

The plastic insulation member 30 having a case shape having a plurality of separate openings and forming a 3D space is manufactured separately from the metallic external case 20, and the capacitor module 10 is inserted in the plastic insulation member 30 having a plurality of separate openings and forming a 3D space. After the capacitor module and the plastic insulation member 30 are inserted in the metallic external case 20, mold resin for a filler is supplied and cured, whereby the capacitor module 10, the plastic insulation member 30, and the metallic external case 20 are integrally fixed.

<Heat Dissipation Effect>

Figure 6:
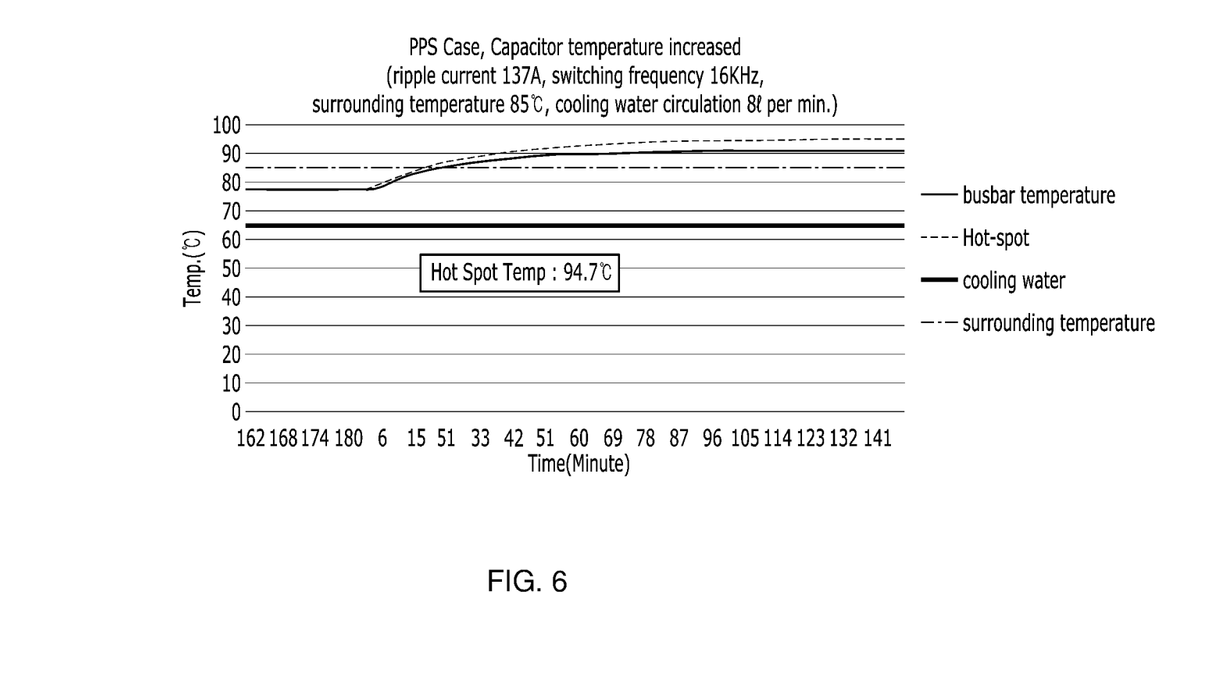
FIG. 6 is a view showing the result of a heat generation test on a plastic case capacitor of the related art.
Figure 7:
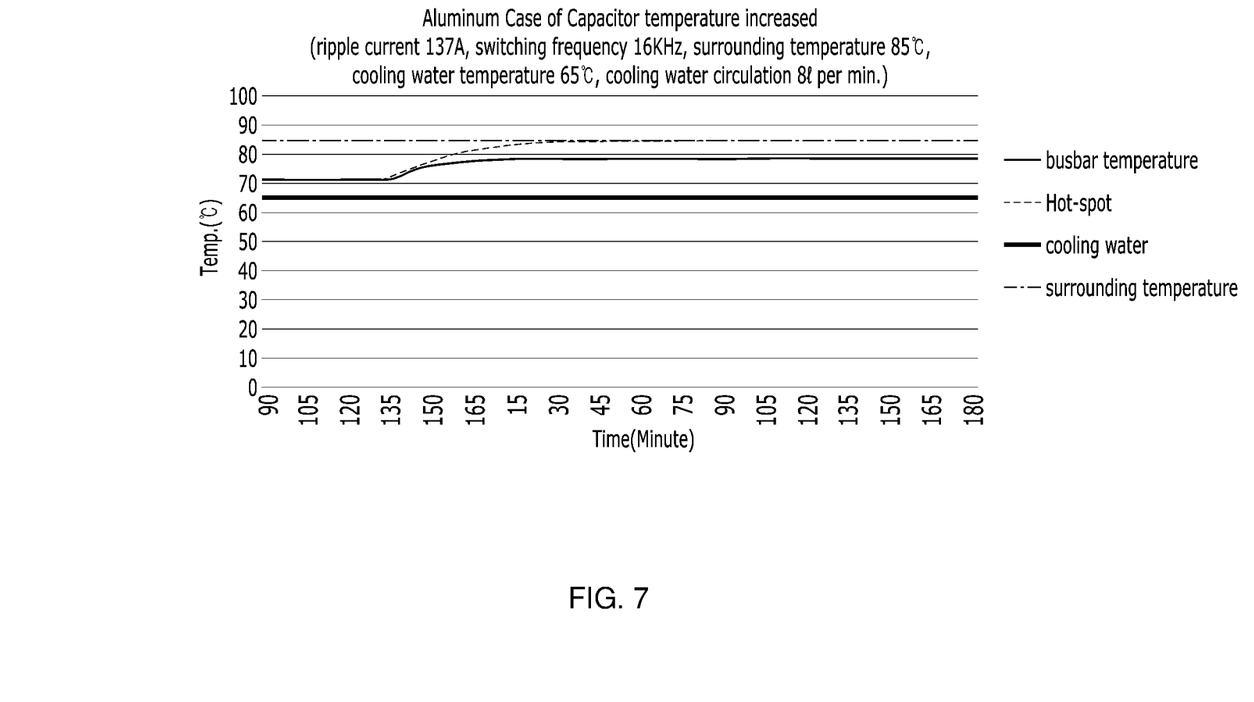
FIG. 7 is a view showing the result of a heat generation test on a metal case capacitor of the present disclosure.

FIG. 6 is a view showing the result of a heat generation test on a plastic case capacitor of the related art and FIG. 7 is a view showing the result of a heat generation test on a metal case capacitor of the present disclosure.

As the result of a test on an inverter circuit under conditions of a ripple current of 137 A, a switching frequency of 16 KHz, a surrounding temperature of 85° C., and a cooling water temperature of 65° C., as shown in FIG. 6, the maximum temperature of capacitor parts in a plastic housing of the related art increased up to 94.7° C. However, as shown in FIG. 7, when the housing of the present disclosure, the maximum temperature of capacitor parts decreased up to 84.7° C., so it could be seen that the heat dissipation performance was excellent.

The heat dissipation characteristic of an aluminum case capacitor was excellent in comparison to an existing PPS case, so there was an effect that temperature was 10° C. lower (a temperature rise of PPS case capacitor 94.7° C.–temperature rise of aluminum capacitor 84.7° C.=10° C.).

The ratio of thermal conductivities of PPS and the aluminum case is 0.359:92 Wm−1C−1. When the material of a case is aluminum, the thermal conductivity is very high, so the effect of dissipating internal heat is high. Accordingly, it is determined that heat generation is very small in a temperature rise test of an aluminum case capacitor. Since an aluminum case was used, ΔT was about 10° C. lower, so the capacity and volume of the capacitor could be decreased as follows.

TABLE 1

|  | Existing product | Improved product | Reduction ration (%) |
| --- | --- | --- | --- |
| Capacity (uF) | 702 | 525 | −25.2% |
| Volume (l) | 0.585 | 0.473 | −19.1% |
| Busbar thickness (mm) | 2 | 1 | −50.0% |

Since the capacity of the capacitor decreases by 25.2%, the material cost decreases by 25%, so external competitiveness is improved. Since the volume decreases by 19.1%, there is a merit that it is advantageous in package designing. Since the busbar material is copper, there is an effect that copper consumption decreases by 50% and the manufacturing cost decreases. An IGBT is disposed on an existing heat sink, the IGBT is pressed by a plate bar, a thermal pad is attached onto the plate bar, and then a PPS case capacitor is placed. When a metal case is used, an IGBT is disposed on a heat sink and is pressed by a capacitor case aluminum housing, whereby there is an advantage that the thicknesses of the plate bar, the thermal pad, and the busbar decrease and there is an effect that the manufacturing cost greatly decreases with reduction of the capacity of the capacitor.

Although the present disclosure was described with reference to the preferable embodiments described above, the scope of the present disclosure is not limited thereto, is determined by the following claims, and may include various changes and modifications in the equivalent range of the present disclosure.

It should be noted that the reference numerals in the following claims are provided only to help understand the present disclosure without influencing construction of the right range and the right range should not be construed narrowly on the basis of the reference numerals.

According to the present disclosure, there is provided a metal case capacitor having a net-shaped plastic insulation housing in a metal housing, the metal case capacitor having the excellent heat dissipation characteristic of a metal case and being able to solve the problem of a short circuit between a metal case and P/N electrodes of a capacitor.

Further, according to the present disclosure, there is provided a metal case capacitor in which a plastic insulation housing is formed in a net shape to have a plurality of openings, whereby the direct coupling area between metal and a filler is increased and adhesion is improved because the filler is supplied through the openings; a metal housing, a plastic housing, and a capacitor module (unit) are strongly coupled by the filler; and the gap between the inner surfaces of the metal housing and the capacitor module (unit) is accurately maintained by the thickness of insulation gap formation members of the plastic insulation housing.

Further, according to the present disclosure, there is provided a metal case capacitor in which straight members constituting insulation gap formation members of a plastic insulation housing are formed in a shape in which a thick section and thin section are repeated and stepped spaces are formed or in a pulse wave shape, whereby excellent durability is maintained even against strong shock because epoxy is completely filled without an air void, and a defect is not generated because an insulation withstanding voltage between a metal case and P/N electrodes of a capacitor is improved.

What is claimed is:

1. A metal case capacitor comprising:
   a capacitor module including a capacitor device formed by winding a dielectric film and having thermally-sprayed surfaces on both sides, a first busbar electrically connected with at least one of the thermally-sprayed surfaces of the capacitor device and having a first lead terminal on an exposed side, a second busbar electrically connected with the other thermally-sprayed surface of the capacitor device and having a second lead terminal on an exposed side, and an insulating sheet disposed between the first busbar and the second busbar to insulate an overlap region;
   a metallic external case having a space, in which the capacitor module is accommodated;
   a plastic insulating member positioned between the capacitor module and the metallic external case and insulating the capacitor module and the metallic external case from each other; and
   a filler permeating in a gel or liquid state into a space between the capacitor module and the metallic external case and then cured therein, wherein the plastic insulation member is a plastic insulation housing, has a plurality of separate openings, and forms a 3D space, and insulation gap formation members positioned on a plurality of planes forming the outline of the space have openings for permeation of the filler, the area ratio of the opening is at least 50% of the entire area, and the thickness of the plastic insulation member is 1 to 10 mm.

2. The metal case capacitor of claim 1, further comprising:

a plurality of busbar extensions integrally formed at the first busbar and having a first lead terminal at front ends in an exposed state outside the case or the filler; and second busbar extensions integrally formed at the second busbar, having a second lead terminal at front ends in an exposed state outside the case or the filler, and overlapping the first busbar extensions, wherein an exposed-side insulation member is configured such that at least two or more first busbar extensions and second busbar extensions overlap each other while each making a pair, thereby forming at least two or more extension assemblies and insulating the non-exposed sides of the extension assembly of the capacitor module and the top of the opening of the metallic external case from each other, and the exposed-side insulation member is integrally formed with the plastic insulation housing by injection molding.

3. The metal case capacitor of claim 2, wherein at least two or more of the exposed-side insulation members are formed, and the exposed-side insulation member is:

an "¬-shaped member" composed of a vertical bar connected with the embedded plastic insulation housing and extending upward toward an open part and a horizontal portion perpendicularly bending from a front end of the vertical portion and being in contact with a top of the opening of the metallic external case; or a "⊏-shaped member" composed of a vertical bar connected with the embedded plastic insulation housing and extending upward toward an open part, a horizontal portion perpendicularly bending from a front end of the vertical portion and being in contact with a top of the opening of the metallic external case, and a second vertical portion bending downward from a front end of the horizontal portion.

4. The metal case capacitor of claim 1, wherein the plastic insulation member having a case shape having a plurality of separate openings and forming a space is manufactured separately from the metallic external case;

the capacitor module is inserted in the plastic insulation member having the plurality of separate openings and forming a 3D space; and after the capacitor module and the plastic insulation member are inserted in the metallic external case, mold resin for a filler is supplied and cured, whereby the capacitor module, the plastic insulation member, and the metallic external case are integrally fixed.

5. A metal case capacitor comprising:

a capacitor module including a capacitor device formed by winding a dielectric film and having thermally-sprayed surfaces on both sides, a first busbar electrically connected with at least one of the thermally-sprayed surfaces of the capacitor device and having a first lead terminal on an exposed side, a second busbar electrically connected with the other thermally-sprayed surface of the capacitor device and having a second lead terminal on an exposed side, and an insulating sheet disposed between the first busbar and the second busbar to insulate an overlap region;

a metallic external case having a space, in which the capacitor module is accommodated;

a plastic insulating member positioned between the capacitor module and the metallic external case and insulating the capacitor module and the metallic external case from each other; and a filler permeating in a gel or liquid state into a space between the capacitor module and the metallic external case and then cured therein, wherein the plastic insulation housing is a plastic housing having a plurality of separate openings and forms a 3D space and insulation gap formation members positioned on a plurality of planes forming the outline of the space are disposed in a mesh type.

6. The metal case capacitor of claim 5, wherein the metallic external case has a substantially hexahedral space and is closed on five surfaces except for a first open part providing an input space for supplying the filler, the plastic insulation housing has an outline corresponding to the inner surfaces of the metallic external case and has insulation formation members on five surfaces except for a second open part positioned to correspond to the first open part.

7. The metal case capacitor of claim 5, wherein the insulation gap formation members form a 3D net with an open surface by forming a net by crossing plastic straight members, plastic straight members are provided in a shape in which a thick section and a thin section having a thickness smaller than the thickness of the thick section are repeated, and when the plastic insulation housing and the capacitor module are seated in the metallic external case, a filer permeation space narrowed by the insulation gap formation members adjacent to first and second open parts is widened by a stepped space formed by the thick section.

8. The metal case capacitor of claim 7, wherein the thickness of the thick section of the plastic straight member is 2 to 2.5 mm, and the thickness of the thin section is 0.7 to 4 mm.

9. The metal case capacitor of claim 7, wherein the insulation gap formation members of the plastic insulation housing form a 3D net with an open surface by forming a net by crossing plastic straight members, the plastic straight members are pulse wave-shaped straight members having a thickness which is different than the thicknesses of the thick section and the thin section and having an entirely straight profile in which bending and unbending are repeated, and when the plastic insulation housing and the capacitor module are seated in the metallic external case, the filer permeation space narrowed by the insulation gap formation members adjacent to first and second open parts is widened by repeatedly spaces formed on the straight profile, so permeation of a filler becomes easy.

10. The metal case capacitor of claim 5, wherein the plastic insulation member having a case shape having a plurality of separate openings and forming a space is manufactured separately from the metallic external case;

the capacitor module is inserted in the plastic insulation member having the plurality of separate openings and forming a 3D space; and after the capacitor module and the plastic insulation member are inserted in the metallic external case, mold resin for a filler is supplied and cured, whereby the capacitor module, the plastic insulation member, and the metallic external case are integrally fixed.

* * * * *